United States Patent [19]

Satoh

[11] Patent Number: 4,884,159

[45] Date of Patent: Nov. 28, 1989

[54] BRAKING ARRANGEMENT IN A MAGNETIC TAPE CASSETTE

[75] Inventor: Takateru Satoh, Nagano, Japan

[73] Assignee: TDK Corporation, Japan

[21] Appl. No.: 115,534

[22] Filed: Oct. 30, 1987

[30] Foreign Application Priority Data

Nov. 5, 1986 [JP] Japan .......................... 61-169003[U]
Nov. 5, 1986 [JP] Japan .......................... 61-169004[U]

[51] Int. Cl.⁴ .......................................... G11B 23/04
[52] U.S. Cl. ................................. 360/132; 242/198
[58] Field of Search ............... 360/132; 242/197–199

[56] References Cited

U.S. PATENT DOCUMENTS

| | | | |
|---|---|---|---|
| 4,572,461 | 2/1986 | Horikawa et al. | 242/198 |
| 4,635,879 | 1/1987 | Sumida et al. | 360/132 X |
| 4,646,190 | 2/1987 | Meguro | 360/132 |
| 4,676,453 | 6/1987 | Komijama et al. | 242/198 X |
| 4,678,138 | 7/1987 | Nemoto | 360/132 X |
| 4,714,213 | 12/1987 | Watanabe et al. | 242/198 |
| 4,750,074 | 6/1988 | Oishi | 360/132 |
| 4,771,351 | 9/1988 | Tanaka et al. | 360/132 |

FOREIGN PATENT DOCUMENTS

| | | | |
|---|---|---|---|
| 60-187982 | 9/1985 | Japan | 360/132 |
| 61-240491 | 10/1986 | Japan | 360/132 |

Primary Examiner—John H. Wolff
Attorney, Agent, or Firm—Steinberg & Raskin

[57] ABSTRACT

A magnetic tape cassette which can be smoothly assembled and smoothly operated for a long period of time without any malfunctions in operation. In the magnetic tape cassette, a spring support for holding a hub brake spring and an abutment for provisionally holding an extension of a hub brake spring are pivoted on a lower casing member of a casing in which a magnetic tape is received, and a release element for releasing the provisionally held hub brake spring from the abutment to transfer it to a spring engagement of the hub brake is provided on the upper casing member. Also, the spring engagement is arranged on the other side of the hub brake so as to project therefrom.

6 Claims, 7 Drawing Sheets

BRAKING ARRANGEMENT IN A MAGNETIC TAPE CASSETTE

BACKGROUND OF THE INVENTION

1. Field of the Invention

This invention relates to a magnetic tape cassette, and more particularly to a magnetic tape cassette which has a magnetic tape received therein, such as a digital audio tape which is used to record a digital signal such as a (pulse code modulation) PCM signal thereon and reproduce it.

2. Description of the Prior Art

Recently, a PCM recording and reproducing apparatus has been proposed which is adapted to convert an analog signal such as an acoustic signal or the like into a digital signal such as a PCM signal, record it on a magnetic tape and reproduce it from the tape. Typically, such conventional PCM recording and reproducing apparatus is generally constructed to obtain a relatively high recording density by means of a rotation head. In the apparatus, a recording or reproducing operation is carried out by drawing out a magnetic tape from a magnetic tape cassette and winding it on the rotation drum on which the rotation head is provided.

A conventional magnetic tape cassette used in the PCM recording and reproducing apparatus fails to reproduce a signal recorded on a magnetic tape when a fingerprint or any foreign matter such as dust or the like is left thereon. In order to prevent such a problem, it is necessary to sealedly receive the magnetic tape in the cassette as much as possible. Also, it is necessary to provide the cassette with a space sufficient enough to insert a guide of a cassette deck or the like in the cassette, said guide serving to draw out the magnetic tape from the cassette during a recording or reproducing operation.

For this purpose, the conventional magnetic tape cassette includes a casing consisting of an upper and lower casing member in which a pair of reel hubs on which a magnetic tape is wound are rotatably housed. The reel hubs are each formed at a portion thereof above the magnetic tape wound thereon with a lock which is engaged with a hub brake arranged in the casing so as to be slidable in a direction perpendicular to a line defined by connecting axes of the reel hubs. The magnetic tape cassette also includes a slider arranged on the outside of the lower casing member so as to be slidable in the longitudinal direction of the casing to open or close a space defined in the casing for inserting a guide of a cassette deck therein and a front cover pivotally mounted on the casing so as to be pivotally moved due to movement of the slider to open or close a front portion of the casing.

In the conventional magnetic tape cassette constructed as described above, the front cover is pivotally moved about 90 degrees from the front portion of the casing to the upper casing member, so that the magnetic tape may be exposed at the front portion of the casing and the slider may be rearwardly moved to open the space for inserting the guide of the cassette deck therein. During non-use of the magnetic tape cassette, the slider and front cover cooperate with the casing to sealedly receive the magnetic tape in the casing and the hub brake is positioned so that a projection provided at each arm thereof may be ready for engagement with an engagement element provided on an inner surface of the front cover to cause the hub brake to be disengaged from the locks when the front cover is pivotally moved again. Also, during non-use the cassette prevents the reel hubs from being moved, thus preventing damage of the magnetic tape due to slack or bending.

In the conventional magnetic tape cassette constructed as described above and as shown in FIGS. 1 and 2, the hub brake 100 is provided with an engagement element comprising a recess 102 for holding a hub brake spring or double torsion spring 104 and pressing elements 106 inwardly projecting from the recess 102. However, such construction causes a part of a wall of the hub brake 100 to be substantially thin, resulting in deformation of the hub brake due to force applied thereto from the spring 104 or a variation in temperature, and makes the operation of assembling the hub brake 100 and inserting the hub brake spring 104 into the hub brake 100 highly troublesome.

Further, the above-described construction of the hub brake 100 causes pressure from the hub brake 104 to be applied to the hub brake 100 prior to the operation of combining the upper and lower casing members 108 and 110 together. This causes the reel hub 112 to be inclined or lifted as shown in FIG. 3, resulting in the lock 114 formed on the reel hub 112 interfering with a guide rib 116 formed on an inner surface of the upper casing member 108, thus making the combining together of the upper casing member 108 and the lower casing member 110 troublesome or highly difficult. Further, use of the hub brake spring 104 having strong force often causes damage to the hub brake 100 and/or reel hub 112 during assembling or operation.

Accordingly, it would be highly desirable to develop a magnetic tape cassette which is capable of constantly carrying out satisfactory operation for a long period of time and capable of being readily manufactured and assembled.

SUMMARY OF THE INVENTION

Generally speaking, in accordance with the present invention, a magnetic tape cassette is provided. The magnetic tape cassette includes a casing comprising an upper casing member and a lower casing member combined together, in which a pair of reel hubs having a magnetic tape wound thereon are rotatably arranged. The reel hubs are each provided at a portion thereof above the magnetic tape wound thereon with lock means. Also, in the casing there is slidably arranged a hub brake which is releasably engaged with the lock means. The hub brake has one side opposite to the reel hubs and the other side opposite to the one side. The magnetic tape cassette also includes a hub brake spring provided in the casing so as to force the hub brake toward the lock means of each of the reel hubs to selectively engage the hub brake with the lock means and a front cover pivotally fitted on a front portion of the casing so as to selectively close and open the front portion of the casing due to its pivotal movement. The front cover selectively engages with the hub brake to release engagement of the hub brake with the lock means against the hub brake spring. The hub brake is provided on the other side thereof with a spring engagement so that it may be engaged with the hub brake spring.

Accordingly, it is an object of the present invention to provide a magnetic tape cassette which is capable of constantly carrying out satisfactory operation for a long period of time.

It is another object of the present invention to provide a magnetic tape cassette which can be easily manufactured and assembled.

It is a further object of the present invention to provide a magnetic tape cassette which has a hub brake which can satisfactorily function for a long period of time.

It is still another object of the present invention to provide a magnetic tape cassette which is capable of being readily assembled.

It is yet another object of the present invention to provide a magnetic tape cassette which is capable of effectively preventing inclining and/or lifting of a reel hub, thus facilitating its assembling.

Still other objects and advantages of the invention will be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings; wherein.

DETAILED DESCRIPTION OF THE PREFERRED EMBODIMENT

Now, a magnetic tape cassette according to the present invention will be described hereinafter with reference to the accompanying drawings.

Figure 4:
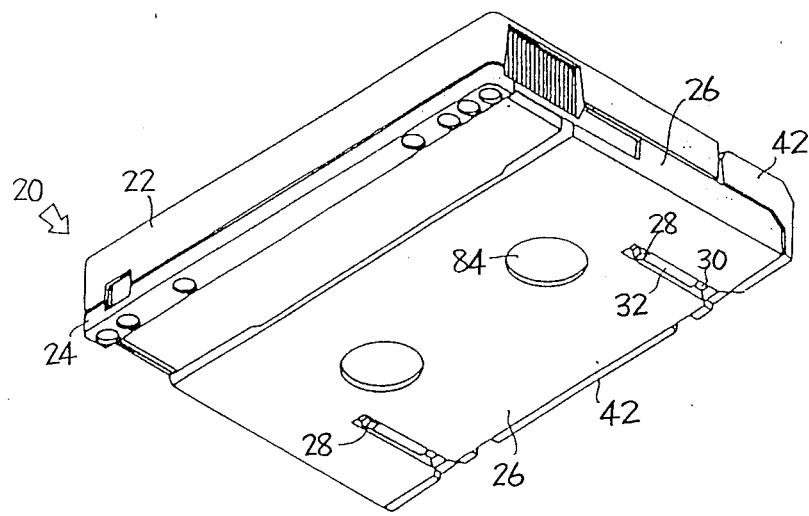
FIG. 4 is a perspective view showing an embodiment of a magnetic tape cassette according to the present invention.
Figure 5:
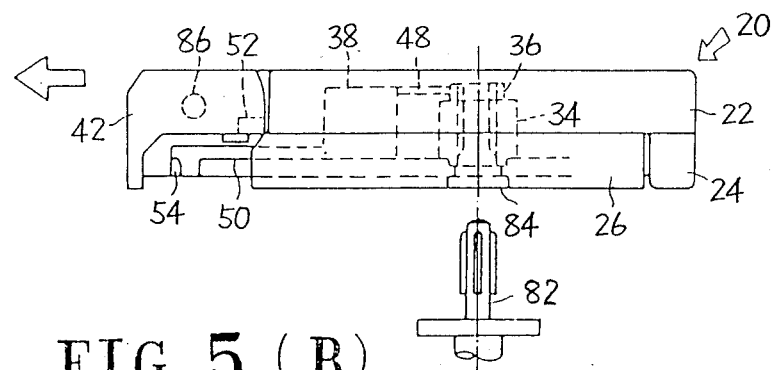
FIG. 5(A) is a side elevation view showing the magnetic tape cassette of FIG. 4 during non-use.
FIG. 5(B) is a side elevation view showing the magnetic tape cassette of FIG. 4 during use.
Figure 5:
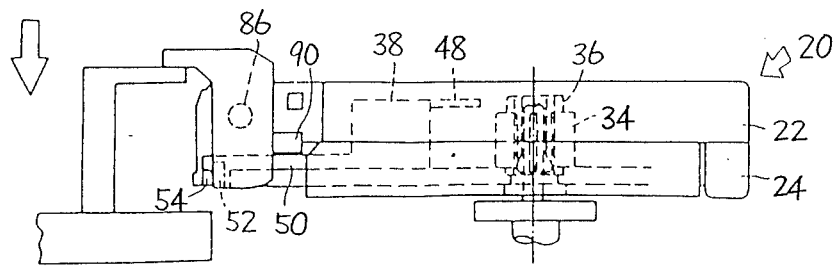
Figure 6:
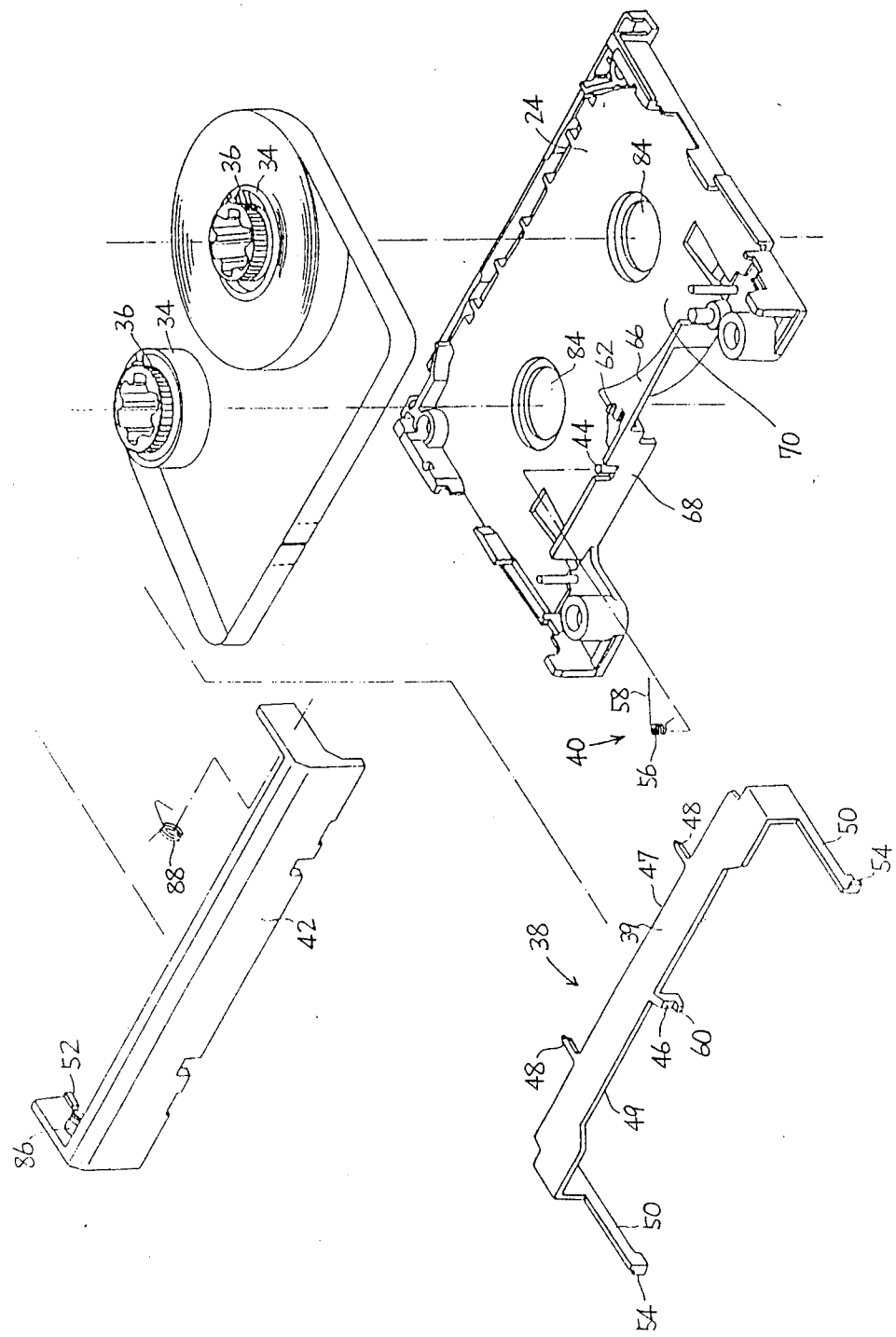
FIG. 6 is an exploded perspective view of the magnetic tape cassette shown in FIG. 4.

FIGS. 4 to 6 illustrate an embodiment of a magnetic tape cassette according to the present invention. A magnetic tape cassette of the illustrated embodiment includes a casing generally designated by reference numeral 20, which comprises an upper casing member 22 and a lower casing member 24 combined with each other. The lower casing member 24 has a slider 26 fitted thereon so as to cover a part of a bottom surface and side surfaces of the casing 20. The slider 26 is slidably fitted on the casing so as to operably operate an entrance of a space defined in the casing 20 for receiving a guide mechanism of a cassette deck or the like (not shown). The slider 26 is formed with through-holes 28 and 30 and the casing 20 is provided at portions thereof corresponding to the through-holes 28 and 30 with lock elements 32. The lock elements 32 are each formed with a head portion which is fitted in the through-holes 28 and 30 when the slider 26 is positioned to close and open the entrance of the space defined in the casing 20, respectively, resulting in the slider 26 being locked.

In the casing 20 are rotatably arranged a pair of reel hubs 34 on which a magnetic tape is wound. At least one of the reel hubs 34 is formed at a portion thereof above an upper side of the wound magnetic tape with lock means 36. In the illustrated embodiment, the lock means 36 is provided at a small-diameter portion of each of the reel hubs 34.

The magnetic tape cassette also includes a hub brake 38 which has a brake body 39 of a flat and elongated shape, said hub brake 38 being slidably arranged at or in the casing 20 and engaged with the lock means 36 of the reel hubs 34, and a hub brake spring 40 which is arranged at or in the casing 20, said hub brake 40 serving to force the hub brake 38 to releasably engage it with the lock elements 32 of the reel hubs 34. In addition, the magnetic tape cassette includes a front cover 42 pivotally mounted or fitted on a front portion of the casing 20. When the front cover 42 is pivotally moved, it generates braking force sufficient to disengage the hub brake 38 from the lock means 36 of the reel hubs 34.

The hub brake 38 is slidably arranged in the casing 20 in a manner to be slid in a direction perpendicular to a line defined by connecting axes of the reel hubs 34. The hub brake spring 40 is held at a spring support 44 provided on the lower casing member 24. In the illustrated embodiment, the spring support 44 comprises a pin or rod rigidly arranged on the lower casing member 24 so as to upwardly extend therefrom. Correspondingly, the hub brake 38 is provided with a spring engagement 46 with which the hub brake spring 40 is engaged. In the illustrated embodiment, the hub brake 38 is adapted to be constantly forced toward the reel hubs 34 by the hub brake spring 40 engaged therewith. Thus, it will be noted that the hub brake spring 40 is interposed between the spring support 44 and the spring engagement 46. The hub brake 38 is also provided with at least one engagement element 48 which is engaged with the lock means 36 of the reel hub 34. In the illustrated embodiment, two such engagement elements 48 are arranged parallel to each other so that they may be engaged with the lock means 36 of both reel hubs 34, respectively.

The embodiment, as best seen in FIG. 6, is so constructed that the engagement elements 48 comprise rigid pin-like projections arranged on one side 47 of the hub brake body 39 opposite to the reel hubs 34 so as to outwardly extend therefrom, and the spring engagement 46 comprises a rigid projection of an arm-like shape provided on the other side 49 of the hub brake body 39 opposite to the one side 47 so as to outwardly and downwardly extend therefrom.

Further, the hub brake 38 is formed on each end of the hub brake body 39 with an arm 50, both of which arms 50 are adapted to be selectively engaged with the front cover 42 when it is pivotally moved. For this purpose, in the illustrated embodiment, the front cover 42 is provided on an inner surface of both ends thereof with an inwardly extending projection 52 and each of the arms 50 is provided on an outer surface of a distal end thereof with a protrusion 54 which is engaged with the corresponding projection 52 of the front cover 42 and pushed in a direction opposite to the reel hubs 34 to release engagement between the lock means 36 and the engagement elements 48 when the front cover 42 is pivotally upwardly moved.

In the illustrated embodiment, the spring support 44 comprises the pin or rod mounted on the lower casing member 24 as described above and the hub brake spring 40 comprises a cantilever torsion spring comprising a coil section 56 fittedly supported on the spring support 44 and an extension 58 extending from the coil section 56 and engaged with the spring engagement 46 to force the hub brake 38 toward the reel hubs 34. The spring engagement 46 is formed into a substantially L-shape or arm-like shape so as to have a stopper 60 formed on an outer surface of a distal end thereof so as to outwardly project therefrom. The stopper 60 serves to ensure more positive engagement between the spring engagement 46 and the hub brake spring 40.

In addition, in the magnetic tape cassette of the illustrated embodiment, the lower casing member 24 may be provided thereon with an abutment 62 which serves to provisionally hold the extension 58 of the hub brake spring 40, as well as the above-described spring support 44. Correspondingly, the upper casing member 22 is provided on an inner surface thereof with a release element 64 (FIG. 11) which acts to release the extension 58 of the hub brake spring 40 provisionally held on the abutment 62 therefrom to transfer it to the spring engagement 46 of the hub brake 38. Such construction facilitates assembling of the magnetic tape cassette.

Figure 8:
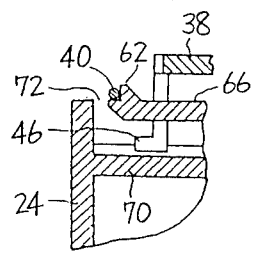
FIG. 8 is a sectional view taken along line VIII—VIII of FIG. 7.
Figure 9:
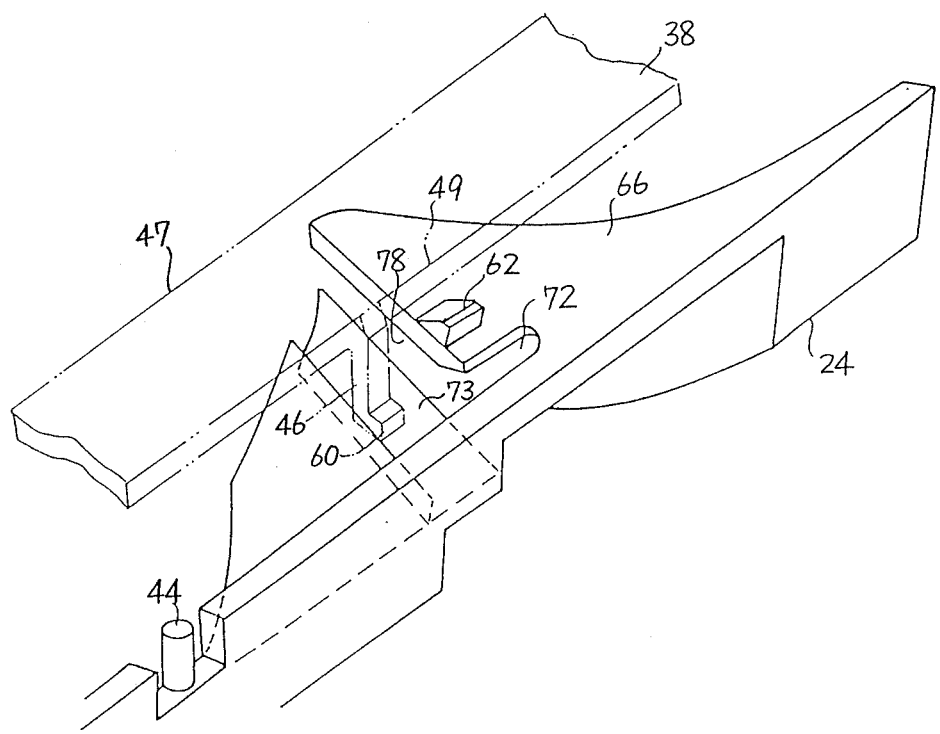
FIG. 9 is an enlarged perspective view showing an essential part of the magnetic tape cassette shown in FIG. 4.
Figure 11:
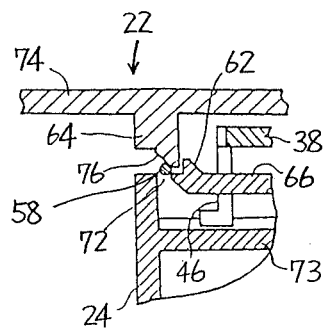
FIG. 11 is a sectional view taken along line XI—XI of FIG. 10.

In the illustrated embodiment, the abutment 62, as shown in FIGS. 8 and 11, comprises a prominence provided on an upper surface of a horizontal wall member 66 of any suitable shape formed on a front side wall 68 of the lower casing member 24 so as to inwardly extend therefrom and formed at a tip end surface thereof with a support recess for supporting the hub brake spring 40 therein. The horizontal wall member 66 is positioned adjacent to the spring engagement 46 of the hub brake 38 and vertically interposed between the brake body 39 of the hub brake 38 and a horizontal bottom wall 70 of the lower casing member 24 to support the hub brake thereon. The spring support 44 is mounted on the front side wall 68 of the lower casing member 24. In an uneven positional relation with the abutment 62 in the vertical direction (FIG. 13) may be arranged a cutout 72 defined between the horizontal wall member 66 and the front side wall 68 so as to serve as an insertion guide through which the extension 58 is inserted under the horizontal wall member 66 as described hereinafter. The release element 64, as shown in FIG. 11, may comprise a projection provided on an inner surface of a horizontal top wall 74 of the upper casing member 22 so as to downwardly extend therefrom and formed at a tip end thereof with an oblique surface portion 76 which is adapted to release engagement between the extension 58 of the hub brake spring 40 and the abutment 62. The spring engagement 46 of the hub brake 38 is so formed and arranged that it may firmly receive thereon the extension 58 of the hub brake spring 40 disengaged from the abutment 62 and downwardly guided through the cutout 72. Further, the extension 58 of the hub brake spring 40 is arranged so as to overlap with an overhang portion 78 of the horizontal wall member 66. Reference numeral 73 designates a guide member arranged between the horizontal wall member 66 and the bottom wall 70 of the lower casing member 24, as clearly shown in FIG. 13, which serves to guide transfer of the extension 58 of the hub brake spring 40 from the abutment 62 through the cutout 72 to the spring engagement 46.

In the illustrated embodiment, the brake body 39 of the hub brake 38 is formed into a flat shape and is visible through a window 80 of the casing 20, so that any indication indicating the type or length of a tape, any figure, or the like may be conveniently made.

In the drawings, reference numerals 82 and 84 designate a drive shaft on which each of the reel hubs 34 is fitted and a hole of the reel hub 34, respectively. Reference numeral 86 indicates a pivot pin provided on both sides of the front cover 42 through which the front cover 42 is pivotally mounted or fitted on the upper casing member 22 and 88 is a coil spring fitted on each of the pivot pins 86. Reference numeral 90 indicates an inspection window through which the terminal end of a tape is observed.

Now, the manner of operation of the magnetic tape cassette of the illustrated embodiment constructed as described above will be described hereinafter.

Figure 1:
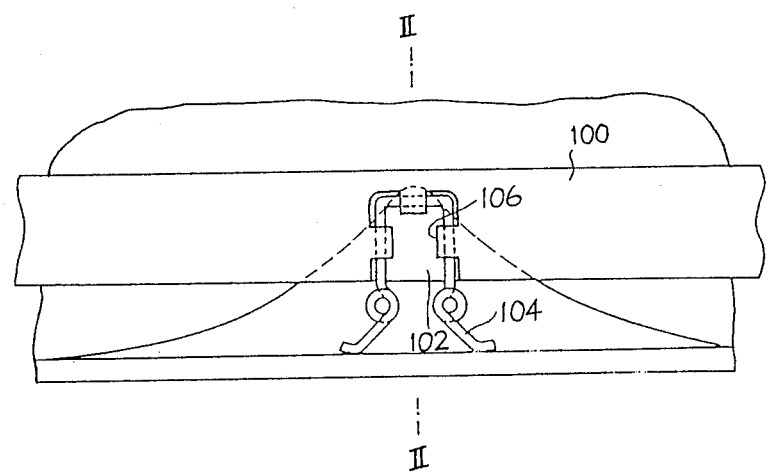
FIG. 1 is a plan view showing an essential part of a conventional magnetic cassette.
Figure 2:
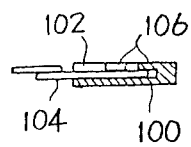
FIG. 2 is a sectional view taken along line II—II of FIG. 1.
Figure 3:
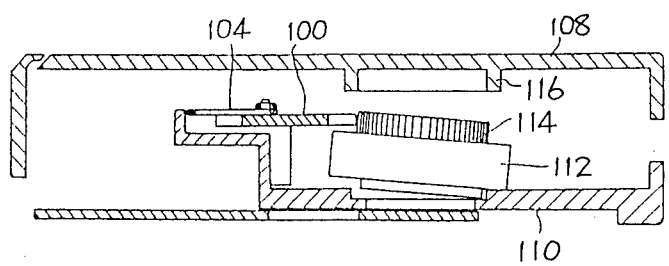
FIG. 3 is a vertical sectional view of the conventional magnetic tape cassette shown in FIG. 1.
Figure 7:
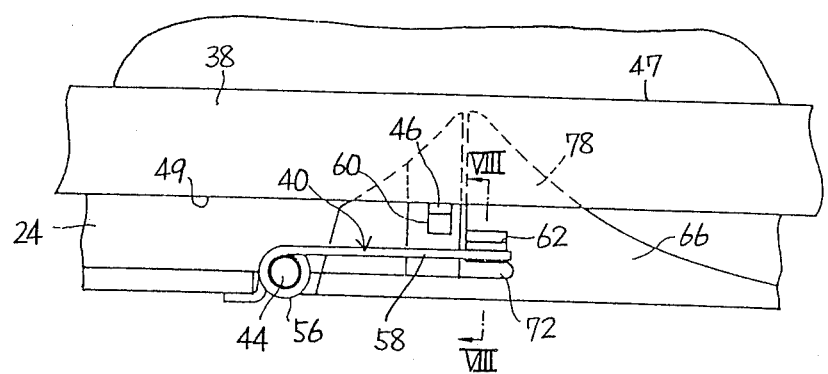
FIG. 7 is an enlarged plan view showing an essential part of the magnetic tape cassette shown in FIG. 4.
Figure 10:
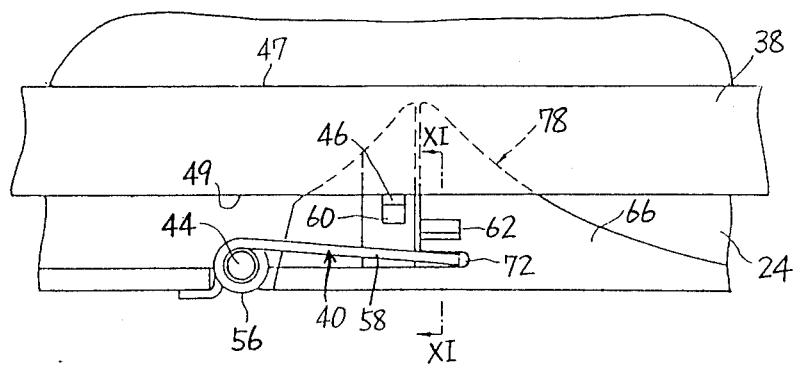
FIG. 10 is an enlarged plan view similar to FIG. 7 showing release of a provisionally held hub brake spring by means of a provided on an upper casing member.
Figure 12:
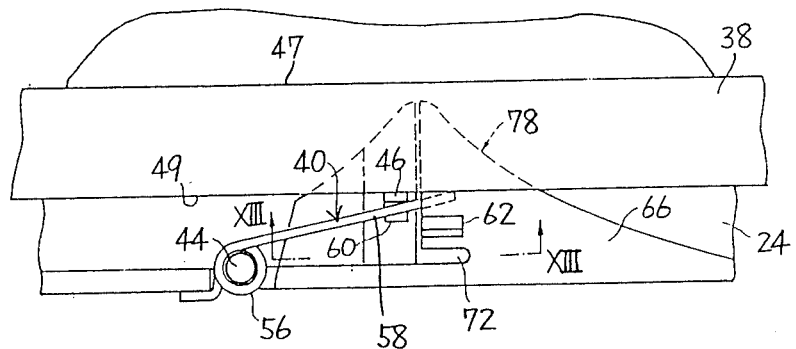
FIG. 12 is an enlarged plan view similar to FIG. 7 showing engagement of a released hub brake spring with a hub brake.
Figure 13:
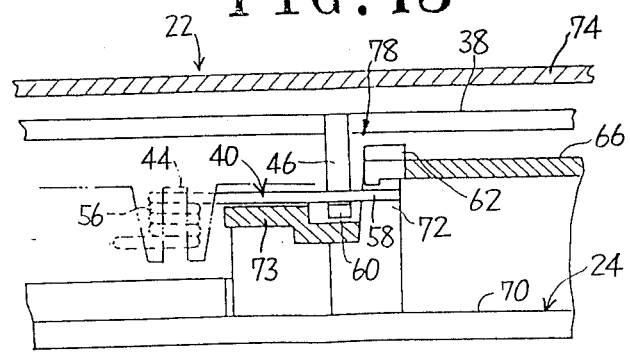
FIG. 13 is a sectional view taken along line XIII—XIII of FIG. 12.
Figure 14:
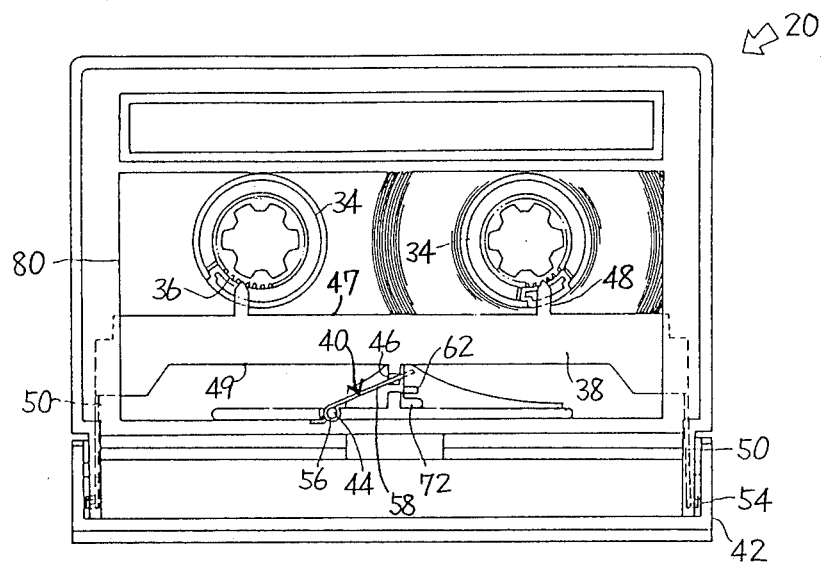
FIG. 14 is a plan view of the magnetic cassette tape shown in FIG. 4.

When the hub brake 38 is incorporated in the lower casing member 24, the hub brake spring 40 is temporarily held on the abutment or prominence 62 of the lower casing member 24, as shown in FIGS. 7 and 8. Then, the upper casing member 22 is combined with the lower casing member 24, so that the lower oblique surface portion 76 of the release element or projection 64 provided on the inner surface of the top wall 74 of the upper casing member 22 may release the extension 58 of the provisionally held hub brake spring 40 from the prominence 62 as shown in FIGS. 10 and 11 and move it through the cutout 72 to a position under the wall member 66, as shown in FIGS. 12 and 13. This results in the released hub brake spring 40 being engagedly held on the spring engagement 46 of the hub brake 38. Thus, the hub brake spring 40 does not act on the hub brake 38 unless the upper casing member 22 is combined with the lower casing member 24 to cause the reel hubs 34 to be aligned with or overlap guide ribs (not shown, but like those designated by reference numeral 116 in FIG. 3) provided on an inner surface of the upper casing member 22, so that inclining and/or lifting of the reel hubs may be effectively prevented, resulting in smooth assembling of the cassette.

During non-use of the magnetic tape cassette, the elastic lock elements 32 are each fitted at the head portion thereof in the through-hole 28 of the slider 26 to lock the slider and close the front portion of the casing 20 with the front cover 42. This results in the magnetic tape being sealedly received in the casing 20 and the hub brake spring 40 forcing the engagement elements 48 of the hub brake 38 toward the lock means 36 of the reel hubs 34 to engage the former with the latter (FIGS. 4 and 5(A)).

Then, when the magnetic tape cassette is charged in a cassette deck (not shown), a release projection provided on the cassette deck side gradually pushes up each of the elastic lock elements 32 while contacting with the head portion of the lock element 32 to disengage it from the through-hole 28, so that the slider 26 may be slidable, and concurrently the front cover 42 is moved to open the front portion of the casing 20 to expose the magnetic tape and the hub brake 38 is moved to release the engagement elements 48 from the lock means 36 of the reel hubs 34, so that the reel hubs may be rotatable (FIG. 5(B)).

Thus, it will be noted that during non-use of the magnetic cassette as shown in FIG. 5(A), the hub brake spring 40 forces the hub brake 38 to engage the engagement elements 48 of the hub brake 38 with the lock means 36 of the reel hubs 34 and the front cover 42 closes the front portion of the casing 20 and causes the protrusions 54 of the arms 50 of the hub brake 38 to be disengaged therefrom, so that the magnetic tape may be firmly and safely held in the casing while being sealedly received therein. Charging of the cassette in a cassette deck pivotally moves the front cover 42 about the pivot pins to open the front portion of the casing 20 and cause the projections 52 to engage with the protrusions 54 to push out the arms 50 of the hub brake 38. Concurrently, this keeps the inspection window 90 open (FIG. 5(B)).

As can be seen from the foregoing, the magnetic tape cassette of the present invention is so constructed that the spring support 44 for holding the hub brake spring 40 an the abutment 62 for provisionally holding the extension 58 of the hub brake spring 40 are provided on the lower casing member 24, and the release element 64 for releasing the provisionally held hub brake spring 40 from the abutment 62 to transfer it to the spring engagement 46 of the hub brake 38 is provided on the upper casing member 22. Such construction prevents the hub brake spring 40 from acting on the hub brake 38 unless the reel hubs 34 are vertically aligned with or overlap the guide ribs (not shown) of the upper casing member 22, so that smooth assembling of the magnetic tape cassette may be accomplished without inclining and/or lifting the reel hubs 34. This significantly increases the operational reliability of the cassette. Also, in the magnetic tape cassette of the present invention, the spring engagement 46 is arranged on the other side 49 of the hub brake 38 so as to project therefrom. Such arrangement of the spring engagement prevents the hub brake from being formed with a thin wall portion with the result that deformation of the hub brake is prevented, even when the cassette is operated for a long period of time at a high temperature.

Thus, it will be noted that the cassette of the present invention ensures smooth operation without any malfunctions in operation.

It will be thus be seen that the objects set forth above, among those made apparent from the preceding description, are efficiently attained and since certain changes may be made in the above construction without departing from the spirit and scope of the invention, it is intended that all matter contained in the above description or shown in the accompanying drawings shall be interpreted as illustrative and not in a limiting sense.

I claim:

1. A magnetic tape cassette, comprising:
   a casing comprising an upper casing member and a lower casing member connected together;
   a pair of reel hubs rotatably arranged in said casing and having a magnetic tape wound thereon;
   lock means provided at a portion of each of said reel hubs above said magnetic tape wound thereon;
   a hub brake slidably arranged in said casing and releasably engaged with said lock means, said hub brake having one side opposite to said reel hubs and the other side opposite to said one side;
   a hub brake spring provided in said casing so as to force said hub brake toward said lock means of each of said reel hubs to selectively engage said hub brake with said lock means;
   a front cover pivotally mounted at said casing so as to selectively close and open a front portion of said casing due to its pivotal movement;
   said front cover selectively engaging with said hub brake to release engagement of said hub brake with said lock means against said hub brake spring;
   a springe engagement provided on said other side of said hub brake so as to be engaged with said hub brake spring;
   wherein said hub brake spring includes a coil portion supported on said lower casing member and an extension held on said spring engagement;
   wherein said spring engagement comprises an arm-like projection mounted on said hub brake so as to downwardly extend therefrom, said arm-like projection being bent at a tip end thereof for securely holding said extension on said spring engagement;
   and additionally comprising
   a spring support provided on said lower casing member for support said hub brake spring;
   an abutment provided on said lower casing member for provisionally holding said extension of said hub brake spring engaged with said spring engagement of said hub brake; and
   a release element provided at said upper casing member for releasing said extension of said hub brake spring held on said abutment to transfer said extension to said spring engagement;
   wherein said lower casing member is provided at an upper end thereof with a wall member for supporting said hub brake thereon;
   wherein said abutment comprises a prominence provided on said wall member along a cutout formed at said wall member for inserting said extension of said hub brake spring therethrough under said wall member;
   wherein said release element of said upper casing member comprising a projection provided on an inner surface of said upper casing member so as to downwardly extending therefrom, said projection being formed at a tip end thereof with an oblique surface portion which pushingly releases said hub brake spring held on said abutment of said lower casing member therefrom;
   wherein said spring engagement of said hub brake spring is positioned so as to receive said extension released from said abutment at a position below said wall member;
   wherein said wall member is provided with an overhang portion; and
   wherein said extension of said hub brake spring is arranged to be overlapped by said overhang portion of said wall member;
   whereby when said hub brake is incorporated in said lower casing member, said hub brake spring is temporarily held on said abutment of said lower casing member, and when said upper and lower casing members are then combined, said lower oblique surface portion of said release element provided on the inner surface of said upper casing member, releases said extension of said spring being provisionally held upon the abutment of the lower casing member and moves the extension through said cutout to a position under said wall member, so that said spring does not act upon said hub brake until said upper casing member is combined with said lower casing member to cause said reel hubs to be aligned, and effectively preventing inclining or lifting of said reel hubs, and providing smooth assembly of said cassette.

2. A magnetic tape cassette as defined in claim 1, wherein said hub brake is arranged in said casing so as to be slidable in a direction perpendicular to a line defined by connecting axes of said reel hubs.

3. A magnetic tape cassette as defined in claim 2, wherein said hub brake is provided on said one side thereof with at least one engagement element engaged with said lock means.

4. A magnetic tape cassette as defined in claim 1, wherein said front cover is provided on both sides thereof with a pair of projections and said hub brake is provided at both ends thereof with a pair of protrusions, said projections of said front cover being abuttedly engaged with said protrusions of said hub brake to release engagement of said hub brake with said lock means when said front cover is pivotally moved to open said front portion of said casing.

5. A magnetic tape cassette as defined in claim 4, wherein one protrusion of said protrusions of said hub brake is arranged on an outer surface of each arm provided at each end of said hub brake, and one projection of said projections of said front cover is provided on an inner surface of each of said sides.

6. A magnetic tape cassette as defined in claim 1, wherein said hub brake spring comprises a cantilever torsion spring which includes a coil section supported on said lower casing member and said extension extending from said coil section and held on said spring engagement, to thereby impart force to said hub brake which is sufficient to normally engage said hub brake with said lock means.

* * * * *